United States Patent [19]
Peterson

[11] Patent Number: 5,857,431
[45] Date of Patent: Jan. 12, 1999

[54] ANIMAL DENTAL AID

[76] Inventor: Deborah L. Peterson, 2791 Fox Hollow Ct., Lake Orion, Mich. 48360

[21] Appl. No.: 916,726

[22] Filed: Aug. 18, 1997

Related U.S. Application Data

[60] Provisional application No. 60/023,684 Aug. 16, 1996.
[51] Int. Cl.[6] ................................................. A01K 29/00
[52] U.S. Cl. ............................................................ 119/710
[58] Field of Search ..................... 119/702, 707, 119/708, 709, 710, 711; 433/80, 215, 216; 604/77

[56] References Cited

U.S. PATENT DOCUMENTS

| | | | |
|---|---|---|---|
| 1,022,112 | 4/1912 | Smith | 119/711 |
| 1,149,170 | 8/1915 | Allis. | |
| 4,802,444 | 2/1989 | Markham et al. . | |
| 5,104,315 | 4/1992 | McKinley | 433/80 |
| 5,126,137 | 6/1992 | Lambert . | |
| 5,191,856 | 3/1993 | Gordon | 119/29.5 |
| 5,474,033 | 12/1995 | Mitchell, Jr. . | |

FOREIGN PATENT DOCUMENTS

| | | | |
|---|---|---|---|
| 2083217 | 12/1971 | France | 119/710 |

*Primary Examiner*—Thomas Price
*Attorney, Agent, or Firm*—Weintraub & Brady

[57] ABSTRACT

An animal chew toy has a shell made from a compressible material and has a plurality of openings formed therethrough. The chew toy has a hollow interior in which is disposed a quantity of dentifrice. When an animal chews the toy, dentifrice issues through the plurality of openings and encounters the teeth and gums of the animal. The shell may be wrapped with any suitable material to attract an animal, and may, likewise, contain a flavored or non-flavored odorant to attract an animal. Similarly, an odorant may be admixed with the dentifrice. If a wrapping is used, the wrapping has openings in communication with the openings in the shell to allow dentifrice to issue therethrough.

15 Claims, 2 Drawing Sheets

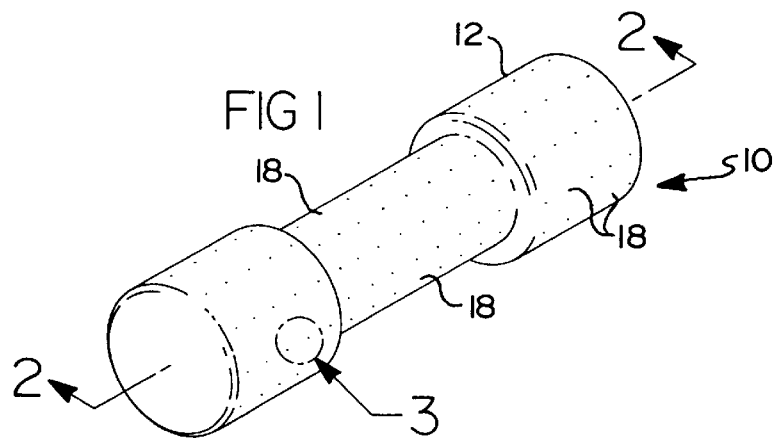
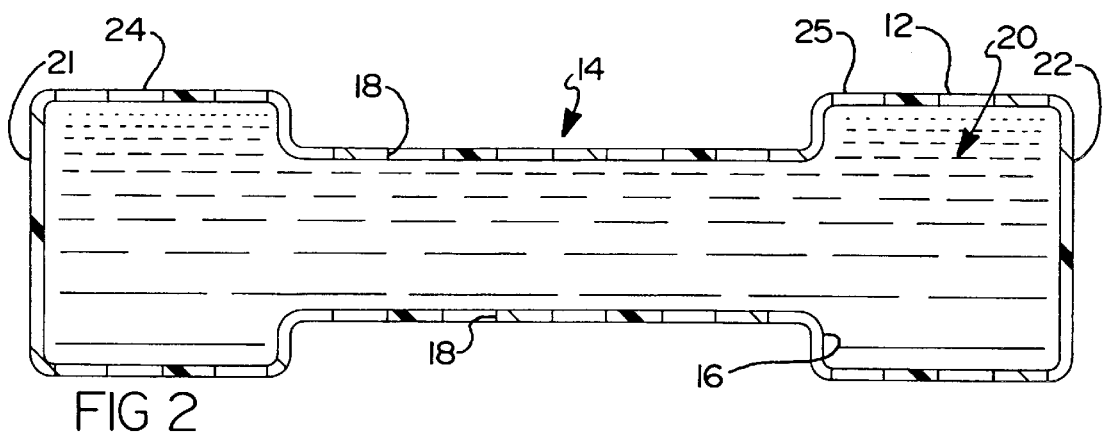
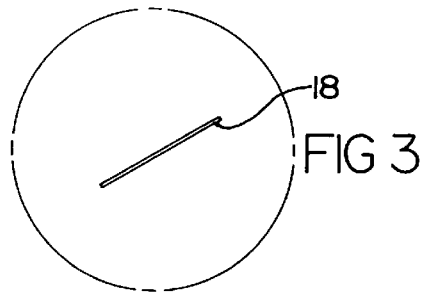
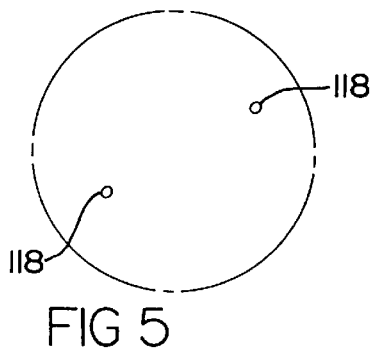
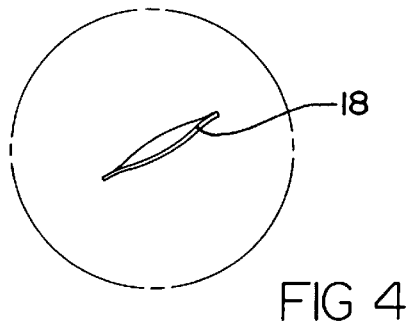

ANIMAL DENTAL AID

CROSS-REFERENCE TO RELATED APPLICATION

This application is a completion application of provisional application Ser. No. 60/023,684, for "Animal Dental Aid," filed Aug. 16, 1996, which is incorporated by reference.

BACKGROUND OF THE INVENTION

1. Field of the Invention

The present invention pertains to dental aids. More particularly, the present invention pertains to dental aids for animals. Even more particularly, the present invention pertains to dentifrice-containing dental aids for animals.

2. Prior Art

As is known to those skilled in the art to which the present invention pertains, domestic animals, through their diet or their inherent nature, oftentimes need dental care. To this end, veterinarians prescribe tooth brushing for the animal, be it a canine or a feline or another animal. However, anyone who has ever attempted to brush the teeth of a cat or a dog knows the difficulties encountered therewith. It is very difficult to keep the animal's mouth open for any extended period of time to enable getting a brush to contact all the teeth as well as the gums. The tediousness of this job often results in the teeth not being brushed. Several prior patents have addressed the problem of dental hygiene for animals. For example, U.S. Pat. No. 1,149,170, issued to Allis, teaches an animal chew toy with an external coating that may have nourishing or medicinal qualities. U.S. Pat. No. 4,802,444, issued to Markham et al., and U.S. Pat. No. 5,126,137, issued to Lambert, teach chew toys with a plurality of apertures that an animal's teeth penetrate into, thus providing a scraping action to remove plaque. And, U.S. Pat. No. 5,474,033, issued to Mitchell, Jr., teaches a chew toy suspended from the neck of an animal, chew toy having an external coating that may provide medication to the animal.

While these prior inventions might be of some limited use in improving dental hygiene of animals, none is as effective as human brushing, because none has the combination of a brushing motion and a substantial amount of dentifrice.

The present invention is directed to solving this problem.

SUMMARY OF THE INVENTION

The present invention alleviates much of the difficulty associated with tooth brushing of an animal by providing a device that readily brings a dentifrice into contact with the teeth of an animal while concomitantly providing exercise to the mouth and jaw of the animal. Moreover, the present invention is embodied in a physical structure that is attractive to the animal.

In accordance with the present invention, there is provided an animal dental aid device, the device comprising:

(a) an outer shell formed from a compressible material and having a hollow interior;

(b) the shell having a plurality of openings formed therethrough which communicate with the interior;

(c) a quantity of veterinary dentifrice disposed in the interior; and wherein a quantity of dentifrice is issued through the openings upon compression of the device.

The shell may be of any suitable configuration to attract an animal, for instance a "dog bone" shape to attract a dog or a "mouse" shape to attract a cat.

A wrapping may be disposed around the shell, the wrapping having openings formed therethrough which are in communication with the openings in the shell. The wrapping may be of any suitable construction to attract an animal, for instance rawhide to attract a dog or soft flocking to attract a cat. The wrapping may also advantageously be made of a flexible or pliant, non-toxic substance such as latex or rubber.

An odorant may be added to the shell and/or wrapping to further attract an animal.

In use, when an animal bites or chews the device, dentifrice in the hollow interior issues through the openings in the shell and encounters the teeth and gums of the animal. In this manner, the biting or chewing motion of the animal's mouth cooperates with the dentifrice issuing through the openings in the shell to effect an effective dental hygiene regimen similar to human brushing of teeth and gums. A quantity of dentifrice limited only by the size of the hollow interior may be disposed therewithin, thereby allowing a relatively long useful life before refilling with more dentifrice is necessary.

For a more complete understanding of the present invention reference is made to the following detailed description and accompanying drawings. In the drawings, like reference characters refer to like parts throughout the several views, in which:

BRIEF DESCRIPTION OF THE DRAWINGS

FIG. 1 is a perspective view of a first embodiment of an animal dental aid in accordance with the present invention;

FIG. 2 is a cross-sectional view taken along line 2—2 of FIG. 1;

FIG. 3 is an exploded, elevational view of a portion of the dentifrice-issuing area of the dental aid from area 3 of FIG. 1, shown in a first position;

FIG. 4 is a plan view of the embodiment of FIG. 3 shown in a second position;

FIG. 5 is a plan view of a second embodiment of a dental aid in accordance herewith;

DESCRIPTION OF THE PREFERRED EMBODIMENT

Figure 6:
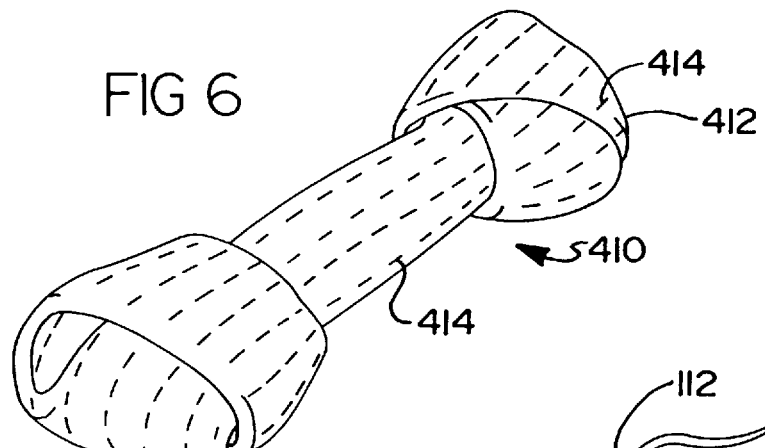
FIG. 6 is a perspective view of a third embodiment of a dental aid in accordance herewith.

At the outset, it is to be noted that by the term "animal dental aid" is meant a device that, when chewed upon by an animal, aids and/or assists in maintaining the dental hygiene of the animal. The device may be used by any canine, feline, or even any rodent-type animal with which dental hygiene is an issue.

Now, and in reference to the drawings, and in particular FIGS. 1 through 4, there is depicted therein an animal dental aid in accordance with a first embodiment of the present invention and, generally, denoted at 10. The dental aid 10 hereof, generally, comprises an outer casing or shell 12 of any suitable configuration. The shell 12, as shown in FIGS. 1 and 2, is configured to simulate the appearance of a "weight lifter's dumbbell." However, and as shown in the further embodiments in FIGS. 5–9, it is to be understood that the shell 12, per se, can have any desired configuration that, in its intended form, will attract the animal for which the dental aid is provided. Thus, with a canine, the shell 12 may be in the configuration of the dog bone depicted in FIG. 6 or similar configurations.

The shell or casing 12 is formed from any suitable material that has a sufficient elasticity to retain its original shape, that does not disintegrate upon repeated biting thereinto, and that is sufficiently compressible to enable the animal to bite the device. The material must also be non-toxic to the animal. Suitable materials include natural rubber, polyurethane, polyethylene, and similar synthetic resinous materials.

Referring, again, to FIGS. 1–4, the shell or casing 12 defines a housing, generally, denoted at 14 having a hollow interior 16. The shell 12 has a plurality of slits or openings 18 circumferentially disposed thereabout. The placement of the slits 18 may be random or ordered. Each slit 18 extends between and communicates with both the exterior of the shell 12 and the hollow interior 16. Preferably, the slits 18 are normally closed through abutment of the material defining the shell, as shown in FIG. 3, and are opened upon the application of sufficient compressive forces being applied thereto, as shown in FIG. 4.

In lieu of the slits 18, a plurality of openings or holes 118 may be disposed around the shell, as shown in FIG. 5. As with the slits 18, the openings or holes 118 communicate with both the exterior of the shell 12 and the hollow interior 16.

As shown in cross-section in FIG. 2, the device 10 comprises a thin-walled housing 14. The housing 14 has a first closed end 21 and a second closed end 22. Proximate each end 21 and 22, the housing 14 has an enlarged diameter portion, 24 and 26 respectively, as shown.

In manufacturing the shell or casing 12, it may be impregnated with an odorant for attracting the animal thereto. These odorants are well known and commercially available products. Commercially available odorants include, without limitation, such flavors as catnip, malt, poultry, and mint. The impregnation may be achieved by any suitable means, such as by directly incorporating the odor into the casing during the manufacture thereof or by coating the shell with the odorant by spraying, immersion dipping, etc. Any technique may be used that does not impair the integrity of the shell or the odorant itself. No specific odorant is critical to the practice hereof; rather, any odorant that has the property of attracting an animal is efficacious in the practice of the present invention.

In defining the dental aid hereof, a quantity of dentifrice, generally, denoted at 20 is disposed within the hollow interior 16 of the shell 12. The dentifrice is of any well known and commercially available type that is amenable to dental hygiene for the animal for which it is intended. One such dentifrice is that sold under the name C.E.T. by St. John Laboratories. This product is defined as an enzymatic veterinary dentifrice. The dentifrice 20 itself may, also, have an odorant, such as those enumerated above, including catnip, admixed therewith to enhance the attraction of an animal thereto.

The dentifrice 20 may be emplaced within the hollow interior 16 by any suitable means, such as by injection through any of the plurality of slits 18 or holes 118.

In use, the device is of a configuration that the animal is both attracted to and bites into. The device is emplaced in the mouth of the animal and is bitten into or chewed by the animal. This causes the slits 18 or holes 118 to open because of the compressive forces applied thereto by the biting or chewing, as shown in FIG. 4. The compressive forces cause the device to "collapse," thus causing the slits 18 or holes 118 to distend. This distension causes the dentifrice 20 to issue through the slits 18 or holes 118 and into the mouth of the animal over the teeth and gums. The dentifrice improves dental hygiene of the animal.

The only limitation to be attached to the configuration of the shell 12 is that it be of such a size that in can be bitten down on, or chewed upon, by an animal with sufficient compressive force to evoke issuance of the dentifrice 20 as described hereinabove. In practicing the invention, it is envisioned that different sizes and shapes of shell be used for dental hygiene of different animals, such as cats and dogs, and even different breeds of the same animal, such as small dogs and large dogs. In this manner, various animals will be able to use the device with facility and thus incur the benefits of improved dental hygiene.

Figure 7:
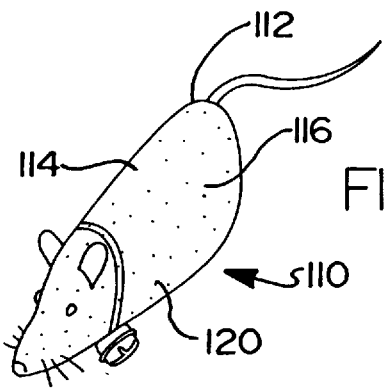
FIG. 7 is a perspective view of a fourth embodiment of a dental aid in accordance herewith.

Thus, in FIG. 7 there is depicted a device 110 configured to the shape of a mouse. The device 110 is formed from a compressive material such as cotton or the like, and comprises an outer shell 112 with a hollow interior (not shown) that communicates with the exterior via slits and/or holes 114 through which dentifrice (not shown) is issued. A flocked covering 116 is disposed exteriorly of the shell 112 to impart a "soft" feel to the device. The flocked covering 116 is, preferably, made of sponge, mesh, cheese cloth, or a similarly porous material. The flocked covering 116 has slits and/or holes 120 formed therethrough that communicate with the slits and/or holes 114 in the shell 112, thus allowing dentifrice from the hollow interior (not shown) to issue from the hollow interior and into the mouth of the animal. This "mouse" configuration is particularly attractive for a feline.

Figure 8:
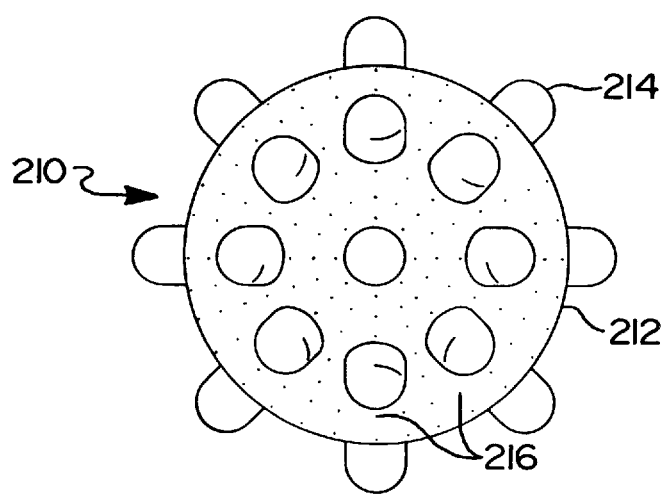
FIG. 8 is a plan view of a fifth embodiment of a dental aid in accordance herewith.

In FIG. 8 there is provided a device 210 in accordance herewith in the form of a squeezable orb 212 having a hollow interior (not shown) and a plurality of projecting nubs 214 formed thereon. In this configuration, slits and/or holes 216 are formed through any of the nubs 214 or the surface area of the shell between the nubs or both. The device works as described hereinabove.

Figure 9:
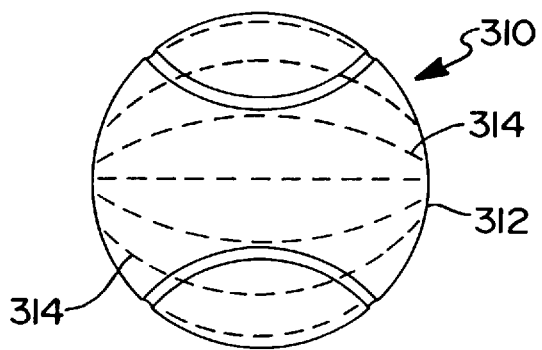
FIG. 9 is a plan view of a sixth embodiment of a dental aid in accordance herewith.

In FIG. 9 there is provided a device 310 in accordance herewith in the form of an orb or ball, such as a "tennis" ball or the like. The ball has a flocked or nubbed surface 312, a hollow interior (not shown), and a plurality of slits and/or holes 314. The device works as described hereinabove.

In FIG. 6 there is provided a device 410 in accordance herewith in the familiar "dog bone" shape. The device has a shell (not shown) with a hollow interior (not shown) and a plurality of slits (not shown) as described hereinabove. A wrapping 412 may be disposed around the shell, as shown. The wrapping has a plurality of slits 414 that communicate with the plurality of slits in the shell, thus allowing dentifrice from the hollow interior to issue through the slits and into the mouth of the animal. The wrapping 412 may be made of any suitable material to make the device more attractive to an animal, such as rawhide for use with a dog, or a neutral, non-toxic, pliant substance or material such as latex or rubber.

Having thus described the present invention, what is claimed is:

1. An animal dental aid device, the device comprising:
   (a) an outer shell formed from a compressible material and having a hollow interior;
   (b) the shell having a plurality of openings formed therethrough that communicate with the interior;
   (c) quantity of veterinary dentifrice is issued through the openings upon compression of the device, wherein the openings are slits, the slits being normally closed, and are openable upon being compressed.

2. The device of claim 1 further comprising a wrapping disposed around the shell, the wrapping having a plurality of openings formed therethrough, the openings of the wrapping being in registry with the openings of the shell.

3. The device of claim 2 wherein the wrapping is a rawhide wrapping.

4. The device of claim 2 wherein the wrapping is a latex wrapping.

5. The device of claim 2 wherein the wrapping is a rubber wrapping.

6. The device of claim 1 further comprising an odorant, the odorant being deposited on the shell to attract an animal thereto.

7. The device of claim 6 wherein the odorant comprises; a catnip flavored odorant.

8. The device of claim 6 wherein the odorant comprises; a malt flavored odorant.

9. The device of claim 6 wherein the odorant comprises; a poultry flavored odorant.

10. The device of claim 6 wherein the odorant comprises; a mint flavored odorant.

11. The device of claim 1 further comprising an odorant, the odorant being admixed with the dentifrice to attract an animal thereto.

12. The device of claim 11 wherein the odorant comprises; a catnip flavored odorant.

13. The device of claim 11 wherein the odorant comprises; a malt flavored odorant.

14. The device of claim 11 wherein the odorant comprises; a poultry flavored odorant.

15. The device of claim 11 wherein the odorant comprises; a mint flavored odorant.

* * * * *